(12) United States Patent
Leggett

(10) Patent No.: US 6,351,589 B1
(45) Date of Patent: Feb. 26, 2002

(54) REMOVABLY COATED OPTICAL FIBRE

(75) Inventor: Clifford Michael Leggett, Bishop Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/374,807

(22) Filed: Aug. 16, 1999

Related U.S. Application Data

(63) Continuation-in-part of application No. 08/972,633, filed on Nov. 18, 1997, now abandoned.

(51) Int. Cl.[7] .................................................. G02B 6/02
(52) U.S. Cl. ...................... 385/128; 385/123; 385/127; 385/100; 385/102
(58) Field of Search .................................. 385/123, 127, 385/128, 141, 143, 144, 100, 102; 427/163.1

(56) References Cited

U.S. PATENT DOCUMENTS

| | | | | |
|---|---|---|---|---|
| 4,750,805 A | * | 6/1988 | Vaderwall | 385/102 |
| 4,801,186 A | * | 1/1989 | Wagatsuma et al. | 385/128 |
| 5,181,268 A | * | 1/1993 | Chien | 385/128 |
| 5,666,452 A | * | 9/1997 | Deitz, Sr. et al. | 385/100 |
| 5,838,862 A | * | 11/1998 | Cien | 385/102 |
| 5,956,445 A | * | 9/1999 | Deitz, Sr. et al. | 385/100 |

* cited by examiner

Primary Examiner—Brian Healy
(74) Attorney, Agent, or Firm—Lee, Mann, Smith, McWilliams, Sweeney and Ohlson

(57) ABSTRACT

A removably coated optical fibre (10) comprises an optionally clad optical fibre core (12) and a removable coating. The coating is formed from an elongate tape (14) having two edges (16, 18). The tape (14) is affixed adjacent the edges along a substantial part of the length of the tape (14) to form a releasable seam (20). Access to the fibre core (12) is obtainable by peeling apart the seam (20). Alternatively, distinct upper and lower tapes (24, 26) may be used to form the removable coating.

66 Claims, 6 Drawing Sheets

REMOVABLY COATED OPTICAL FIBRE

RELATED APPLICATION

This application is a continuation-in-part of U.S. patent application Ser. No. 08/972,633, filed Nov. 18, 1997 and now abandoned.

BACKGROUND OF THE INVENTION

This invention relates to a removably coated optical waveguide and in particular to a removably coated optical fibre for laser transmission which may be incorporated into an optical device or telecommunication system.

Since their inception in the mid-1960's, the growth of the use of optical fibres, generally manufactured from silica or other glasses, in optical devices and telecommunication systems has been substantial. This growth has been due largely to the remarkable data carrying capacity displayed by fibres.

Generally speaking the optical fibre comprises an optical fibre core, of a certain refractive index, which may be clad by an optical cladding of slightly lower refractive index. Alternatively, a graded index fibre, which comprises layers of optical material with decreasing refractive indices, may be employed.

However, optical fibres do have a significant draw back, in that they are relatively brittle and fragile. Therefore, optical fibres are commonly provided with a protective coating of a plastics material, commonly a UV curable material such as an acrylate or a UV curable polymide. Desolite 950-106, 950-108, 950-131 and 3471-3-14 are routinely used for coating optical fibres for general purpose uses. Thermally cured silicon coatings, such as Sylgard 180 and 184 are also available. However, these materials provide a relatively soft and tacky coating which is used in either high temperatures or chemical environments in which acrylate coatings are not suitable.

For practical use in telecommunication systems such coated fibres may be combined into multi-fibre cables formed, for example, from a polyurethane outer jacket. If additional strengthening is required the jacket may be provided with strengthening members formed, for example, from Kevlar. However, as this application relates to the coating of individual fibres, such multi-fibre cables will not be discussed further herein.

In use optical fibres tend to be end coupled and end pumped, at least in part because of the requirement to coat the fibres. That is, any useful radiation within the optical fibre is injected through the end face of the fibre, travels the full length of the fibre through internal reflection, in the normal manner, and is transmitted from the remote end of the fibre.

However, in some situations there are significant advantages to be gained from direct access to uncoated portion of the optical fibre. By far the most important of these is the use of a light source to produce permanent light sensitive changes within the optical fibres. In other words advantages are gained from the use of a light source to produce a periodic refractive index modulation within the fibre in the form of a grating. The most common light source used is a UV laser such as an Eximer or Argon ion laser. Such gratings can be used in a host of devices from sensors and band pass filters to fibre laser mirrors.

Applications which require the removal of the coating over lengths exceeding 50 mm include, for example: fibre grating dispersion equalisers and long period gratings, which may be written into the optical fibre (either the core or the cladding), for applications which include gain flattening, polarisation rocking and or loss filters; wave length selective polarisers; and cladding mode pumped amplifiers. For example, a dispersion equaliser requires up to eight meters in length of coating to be removed from the fibre, which leaves a substantial length of optical fibre which is open to contamination or physical damage.

In this device a long chirped grating is written into a stripped fibre spanning the 32 nm gain window of an erbium amplifier. Such a device, when connected to the first output port of a three port circulator provides equalisation of dispersed signals transmitted down the fibre. The chirped grating simply removes the wavelength dependent time delay spreading arising from the dispersion in the transmission fibre.

Long period grating applications operate on the basis that a refractive index variation along the length of a fibre has a period that matches the difference in propagation constants for the lowest order mode in the fibre core and some higher order mode in the cladding. This causes power to be transferred from one mode to the other, which can be used to provide wavelength selective loss and polarisation rocking in two moded fibres, ie alternate coupling between the two polarisation modes that exist in so called single mode fibres. In cladding mode pumped amplifiers by writing the index changes in the cladding power can be transferred from the cladding to the core more efficiently than would otherwise be possible.

The invention would be useful for fused couplers where two or more optical fibres are melted together to enable light to be transferred between the respective cores. This process requires the absence of any polymer coating or residue on the fibres.

A further area in which the invention may be useful is in the area of non-intrusive taps wherein a loss mechanism such as micro-bending can be used to eject light from the length of the fibre. If the coating is removed this light can more easily and efficiently be accessed. Therefore, there is a conflict between the need for access to the fibre and the need for protective coatings.

At present, access to lengths of optical fibre is obtained either by dissolving the fibre coating in a suitable organic solvent or the removal of a length of coating using a blade, to scrape away the coating. The problem with the latter approach is that it can damage the fibre or its cladding. Also, the process of dipping the fibre in solvent and washing an drying the fibre thereafter can also result in fibre damage.

Neither of these processes are of real practical value when substantial lengths of fibre greater than a few centimeters need to be stripped. Particularly, the use of a blade to scrape away the protective coating causes significant stress on the fibre which can cause an unacceptable degree of damage.

SUMMARY OF THE INVENTION

It is an object of the present invention to provide a coating for a fibre through which access to the fibre can be obtained, easily and conveniently, with minimal probability of damaging the fibre during the stripping process.

According to a first aspect of the present invention there is provided a removably coated optical fibre comprising:

(i) an optical fibre; and (ii) a removable coating formed from an elongate tape having two edges, the tape being affixed adjacent to said edges along a substantial length of the tape to form a releasable seam, access to the fibre being obtainable by peeling apart said seam.

According to a second aspect of the present invention there is provided a removably coated optical fibre comprising:

(i) an optical fibre; and (ii) a removable coating formed from first and second elongate tapes which are affixed on either side of said optical fibrealong a substantial length of said tapes to form a releasable seam, access to the optical fibre being obtainable by peeling apart said tapes.

The coating may thus be readily and easily removed from the optical fibre by peeling apart along the releasable seam. The seam is manufactured in such a way as to provide a relative weak point in the coating, as compared with the strength of the tapes or other material used to make the coating once access to the fibre has been initiated, relatively large sections of the fibre may be exposed, without damage to the fibre, simply by peeling, pulling or tearing the seam.

Preferably, the coated optical fibre comprises a lubricant provided between said coating and said fibre.

Most preferably, the lubricant is a fluid, for example, ethylene glycol.

Alternatively, the lubricant is a solid, for example, a layer of polytetraflurethene (PTFE) applied to the inner.

Preferably, the tape is formed from low density polyethelene.

Preferably, the tape is sealed adjacent said edges using an adhesive such as a latex based pressure sensitive adhesive.

Preferably, the first elongate tape is planar, said fibre resting thereon, and said second elongate tape is moulded so as to provide an elongate recess for receipt of said optical fibre.

Most preferably, the elongate recess has a substantially "U"-shaped cross-section.

Alternatively, both said first and second tapes comprise an elongate recess arranged such that when the tapes are co-joined a recess is formed for receipt of said optical fibre. In this embodiment it is most preferably that the recesses are both substantially semi-circular in cross section.

Alternatively, both the said first and second tapes are planar.

In this embodiment it is preferable that an additional tape is placed on either side of the optical fibre between the first and second planar tapes.

According to a third aspect of the present invention there is provided a method of manufacture of a removably coated optical fibre including an optical fibre and a removable coating, the method comprising the steps of:

(a) passing an elongate coating tape around a portion of a roller;

(b) passing an optical fibre around said roller so as to rest on said tape; and (c) passing said tape and optical fibre combination through a sealing means to releasably seal the tape adjacent to said edges, so as to enclose said optical fibre within said removable coating, thereby forming said removably coated optical fibre.

According to a fourth aspect of the present invention there is provided a method of manufacturing a removably coated optical fibre including an optical fibre and a removable coating; the method comprising the steps of:

(a) passing a first coating tape around a portion of a roller;

(b) passing said optical fibre around said roller so as to rest on said first tape;

(c) passing a second coating tape around said portion of the roller, on the opposite side of said optical fibre so as to form said removably coated optical fibre.

Preferably, the fibre is passed through a lubricant applicator prior to combination with said tape, at said roller.

Preferably, the lubricant applicator is a bath of ethylene glycol.

Preferably, the fibre is obtained directly from a fibre drawing process.

Alternatively, the fibre is a partially coated fibre obtained directly from a partial coating process.

Preferably, when two tapes are utilised, the first and second coating tapes are stored on separate first and second tape drums, the roller being located on route between said first and second drums and the collection drum.

Most preferably, the first coating tape is moulded to provide a recess to receive said optical fibre, said recess, for example, having a substantially unshaped cross section.

In one embodiment both said first and second tapes may be moulded prior to combination so that the combined tapes provide a recess for receipt of said optical fibre.

In this case, both said first and second tapes have an elongate recess with, for example, a substantially semi-circular cross section.

In a further embodiment, the first and second tapes may be planar.

In this case, an additional tape may be placed on either side of the optical fibre between the planar tapes.

Preferably, said first coating tape is provided on a base tape.

Preferably, said first and second coating tapes are formed from low density polyethelene and said base tape is formed from Kevlar.

Preferably, the rate of accumulation of the removably coated optical fibre on a collector drum is controlled by an accumulator arm placed between the roller and the collector drum.

Preferably, the edges of the tapes are releasably sealed by a sealing means located between the roller and the collector drum.

According to a fifth aspect of the present invention there is provided an apparatus for the manufacture of a removably coated optical fibre comprising an optical fibre; and a removable coating, the apparatus including:

(a) a storage drum for the storage of an elongate coating tape;

(b) means of accessing an optical fibre either directly from the fibre pulling process or alternatively from a fibre partial coating process;

(c) a collection drum to collect and store the removably coated optical fibre;

(d) a roller positioned on route between said storage drum and said collection drum arranged such that said tape and said fibre core are passed around a portion of the roller; and (e) means arranged to enclose the tape around the fibre.

According to a sixth aspect of the present invention there is provided an apparatus for the manufacture of a removably coated optical fibre comprising an optical fibre and a removable coating, the apparatus including:

(a) a first tape drum for the storage of an elongate coating tape;

(b) means of accessing an optical fibre either directly from the fibre pulling process or alternatively from a fibre partial coating process;

(c) a collection drum to collect and store the removably coated optical fibre;

(d) a roller positioned between said drums and arranged such that said tape and said optical fibre are passed around a portion of the roller; and (e) a second tape roller arranged to provide a second tape on the other side of the fibre from the first tape.

Preferably, a further roller carrying a base tape is arranged to position the base tape beneath the first coating tape.

Preferably, a bath of lubricant is positioned between the means for accessing the fibre and the roller wherein the lubricant is ethylene glycol.

Preferably, the tape and optical fibre combination pass through a sealing means which releasably seals the edges of the tape.

Preferably, an accumulator arm is placed between the roller and the collector drum in order to control the rate of accumulation of removably coated optical fibre on the collector drum.

Preferably, a moulding stage is provided between the first tape drum and the roller in order to mould the first tape to provide an elongate recess therein with, for example, a substantially "U"-shaped cross-section to receive the optical fibre.

In addition, a moulding stage may be provided between each tape drum and the roller in order to mould the tapes to provide each tape with an elongate recess therein with, for example, substantially semi-circular cross-sections which, when the tapes are combined, provides a recess to receive the optical fibre.

Alternatively, the first and second tapes may be planar wherein a means is provided for arranging an additional tape on either said of the optical fibre.

According to seventh aspect of the present invention there is provided an optical fibre transmission system comprising an assembly of at least a first and second optical fibre and an associated optical fibre coupler which couples the first and second optical fibres together, said first optical fibre comprising:

(i) an optical fibre having a grating written therein; and
(ii) a removable coating formed from a first and second elongate tapes which are releasably affixed on either side of said optical fibre, access to the grating in the optical fibre being obtainable by peeling apart said tapes.

Preferably, the second optical fibre is a long-haul optical fibre having kilometer order lengths and the first optical fibre is of meter order lengths or less.

Preferably, the grating is a UV laser written grating.

According to an eighth aspect of the present invention there is provided an optical fibre telecommunications system comprising a laser pulse signal input device, an optical transmission line which comprises a removably coated optical fibre and which is optically coupled to the laser pulse signal input device and a receiver means for receiving laser pulse signals output from the optical transmission line to enable transduction of the signal carried by the laser pulses, said removably coated optical fibre having a grating written therein, the removably coated optical fibre comprising:

(i) an optical fibre; and
(ii) a removable coating formed from first and second elongate tapes which are affixed on either side of said optical fibre core, along a substantial length of said tapes to form a releasable seam, access to the fibre being obtainable by peeling apart said seam.

According to a ninth aspect of the present invention there is provided an optical device comprising a removably coated optical fibre in a grating is written, the grating being selected from the group consisting of:

(a) a grating oriented normal to the direction of travel of light to be transmitted along the fibre grating acting as a dispersion equaliser; and a grating oriented non-normally and non-aligned to the direction of travel of the light to be transmitted along the fibre, the grating acting as a non-intrusive radiation mode tap, the removably coated optical fibre comprising
(i) an optical fibre; and
(ii) a removable coating formed from first and second elongate tapes which are affixed on either side of said optical fibre core, along a substantial length of said tapes to form a releasable seam, access to the fibre being obtainable by peeling apart said seam.

Embodiments of the present invention will now be described, by way of example, with reference to the accompany drawings in which.

Figure 1A:
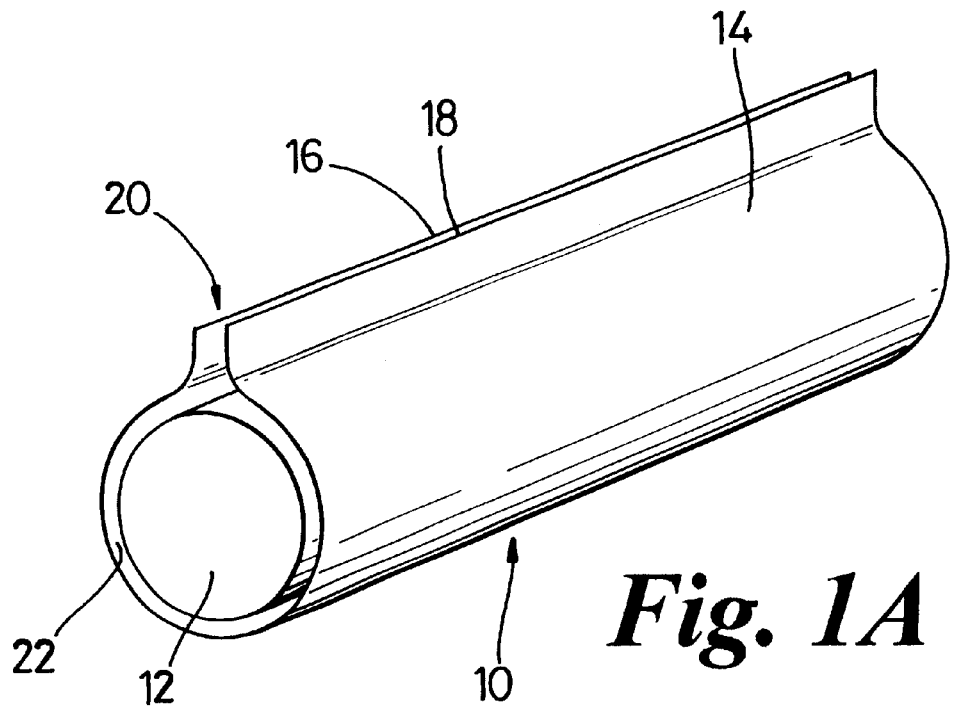
FIGS. 1A and 1B illustrate removably coated optical fibres in accordance with the present invention which, comprise a coating formed from a single elongate tape.

FIGS. 1A and B illustrate a removably coated optical fibre 10 comprising an optical fibre 12 and a removable coating. The removable coating is formed from an elongate tape 14 having two edges 16 and 18. The tape is overlapped adjacent the edges 16 and 18 along a substantial part of the length of the tape to form a releasable seam 20. Access to the fibre 12 is obtainable by peeling apart the seam 20.

FIG. 1A illustrates an embodiment of the invention in which the inner surface 22 of the tape 14 adjacent the edges 16 and 18 are brought together to form a coating having a tear drop shaped cross-section.

Figure 1B:
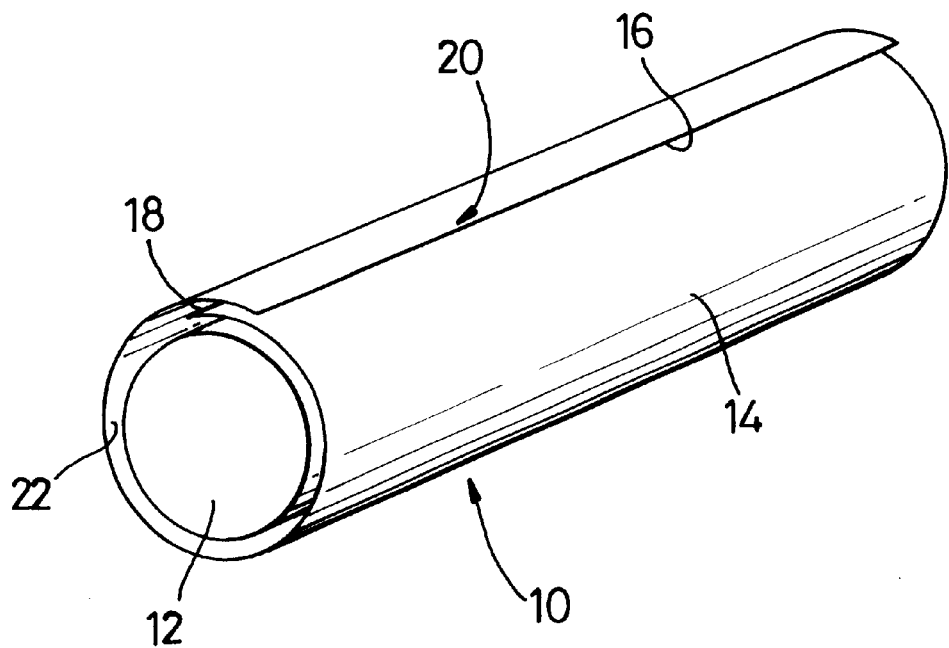

FIG. 1B illustrates a second embodiment in which the inner surface 22 adjacent one edge 16 of the tape 14 is laid over the outer surface adjacent the other edge 18 of tape 14 to produce a removable coating having a substantially circular cross-section.

Figure 2A:
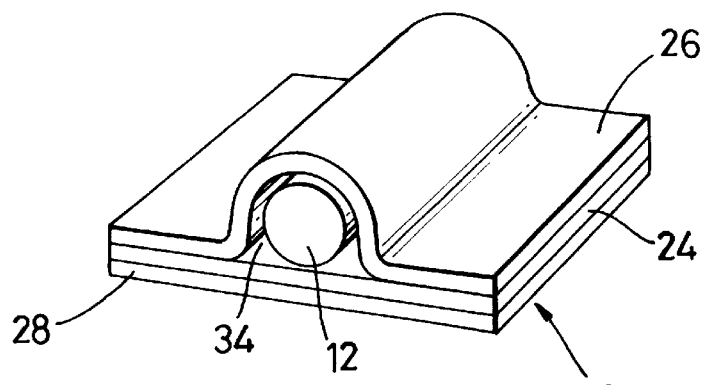
FIGS. 2A, 2B and 2C illustrate removably coated optical fibres which comprise a coating formed from two elongate coating tapes.
Figure 2B:
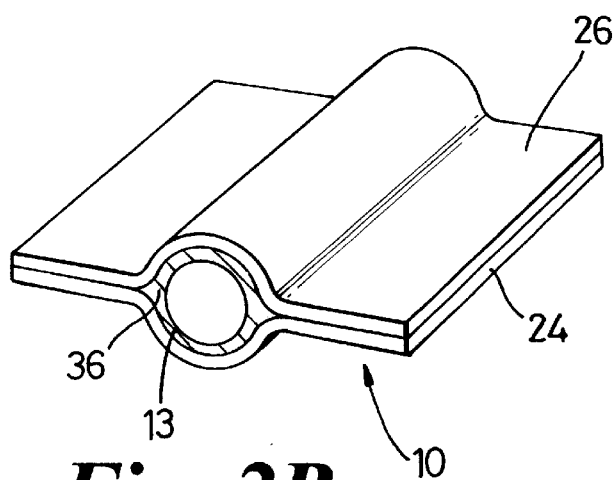
Figure 2C:
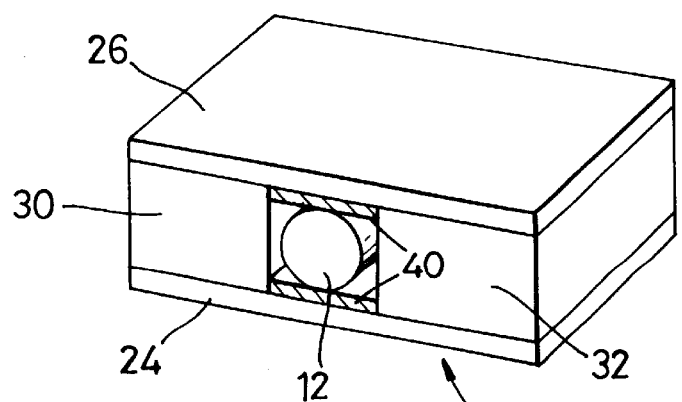

FIGS. 2A, 2B and 2C illustrate further removably coated optical fibres in accordance with the present invention. In these embodiments the removably coated optical fibres comprise an optical fibre 12 as in the FIG. 1 embodiments, and a removable coating. However, in these embodiments the coating is formed from a first elongate tape 24 and a second elongate tape 26. The first and second elongate tapes are removably affixed on either side of the fibre core 12 and access to the fibre core 12 is obtainable by peeling apart the tapes.

In any of the aforementioned embodiments the removable coated fibre 10 may comprise a lubricant 13 provided between the coating and the fibre 12. The lubricant may be a fluid such as ethylene glycol or may be a solid such as polytetraflurethene. In the latter case the solid material may be a coating which is applied to the inner surface of one or both of the tapes 14, 24 and 26. The or each tape 14, 24 and 26 may be formed from any material which is suitable for fibre coating such as low density polyethylene (LDPE). In addition to a single component tape as described above fabric laminate tapes may be utilised.

A portion of each of the tapes adjacent the edges thereof are adhered together by a releasable adhesive such as a liquid applied adhesive, for example, a latex or less ideally an acrylic based pressure sensitive adhesive (e.g. Copydex). The method of application of the adhesive will be described in detail below. This adhesive may also be used in the FIG. 1 embodiment.

In the embodiment illustrated in FIG. 2C, additional tapes 30 and 32 are placed on either side of the fibre 12 between the first and second tapes 24 and 26. In this case each of the first and second tapes 24 and 26 are not adhered together but are adhered to opposite sides of the additional tapes 30 and 32.

In the FIG. 2A embodiment the first elongate tape 24 is planar and, in use, the fibre 12 may rest thereon. In this embodiment the second elongate tape is moulded so as to provide an elongate recess 34 of a substantially "U"-shaped cross-section. This recess is provided to receive the fibre and the lubricant when a lubricant is used.

FIG. 2B illustrates an embodiment of the invention in which both the first and second tapes 24 and 26 are provided with elongate recesses 36 of a substantially semi-circular cross-section. When the first and second tapes 24 and 26 are brought together and adhered these recesses provide an elongate recess in which the fibre 12 is received along with the lubricant when used. FIG. 2B also illustrates the lubricant provided in the recess 36, by the use of hatched lines 13. Alternatively, FIG. 2C illustrates the use of a layer 40 of solid lubricant in the form of a PTFE coating on at least a portion of the first and second tapes 24 and 26.

The ideal width of the tape would vary with the method of construction and cabling requirements. The minimum would be approximately 8 times the fibre diameter, ie 1 mm for a 125 $\mu$m fibre and 2 mm for a 250 $\mu$m fibre. A partially coated fibre for use in accordance with the invention would have a diameter of the order of 250 $\mu$m for a fibre diameter of the order of 125 $\mu$m. The tapes would thus be approximately 5 mm wide. Wider tapes may be useful in some embodiments.

Therefore, the resulting fibre is larger than normal fibre and would allow for text or logos to be more easily printed onto the fibre either before or during the manufacturing process.

Figure 3:
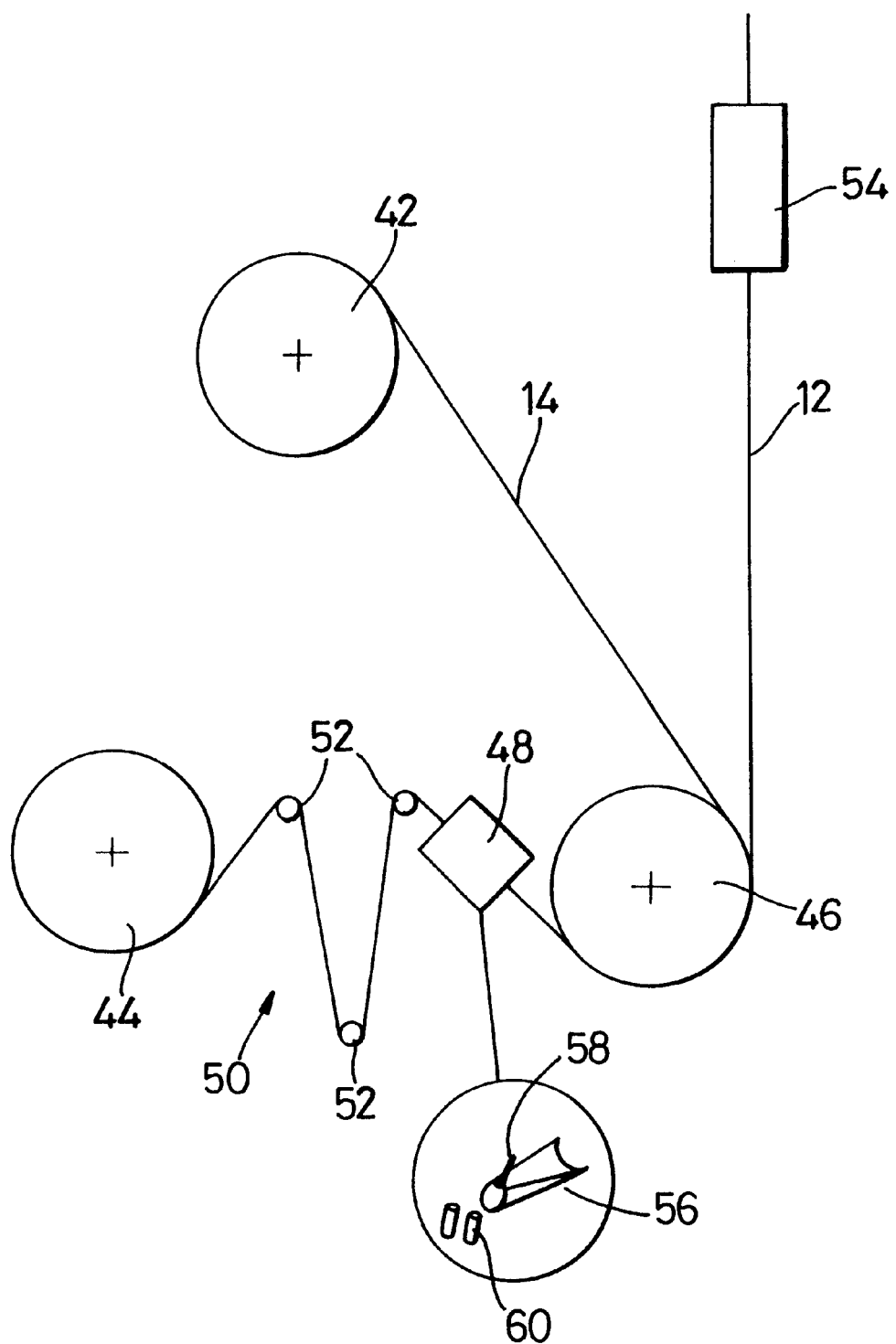
FIG. 3 illustrates an apparatus for manufacturing the fibres of FIGS. 1A and B.

FIG. 3 illustrates the apparatus used in the method of manufacture of a fibre as illustrated in FIG. 1 or 2. The apparatus includes a tape drum 42 on which an elongate tape 14 is stored prior to use and a collection drum 44 on which a manufactured fibre in accordance with the present invention is stored. A roller 46 is located on route between the aforementioned drums 42 and 44. A sealing means 48 is also located between the roller 46 and the collector drum 44. An accumulator 50, in the form of a series of rollers 52, arranged to lengthen or shorten the path between roller 46 and the drum 44 is also illustrated in FIG. 3, as is a vertical lubricant applicator 54.

The method of manufacturing the fibre 10 in accordance with the present invention includes the steps of; passing the coating tape 14 around a portion of the roller 46 on route from the tape drum 42 to the collection drum 44; passing an optical fibre 12 around said roller so as to rest on the elongate tape 14; and passing the tape and fibre combination through the sealing means 48 which releasably seals the tape adjacent the edges 16 and 18 thereof (FIGS. 1A and 1B) so as to enclose the fibre core 12 within the coating tape 14.

An adhesive may be used to seal the tapes, such as a latex or acrylic based pressure sensitive adhesive (e.g. Copydex ™). Alternatively, the tapes may be manufactured from a material which enables sealing without an adhesive, such as a thermoplastic low density polythene which can be sealed using heat and/or pressure. Any adhesive which is used may be applied in the sealing means 48, or may be pre-applied to one or more of the tapes.

FIG. 3 also shows an expanded version of the sealing means 48 which illustrates the cam mechanism 56 which is utilised to fold the edges of the tape 14 around and to bring them together so as that mechanism 58 can be utilised in this embodiment to apply an adhesive to the tape adjacent the edges and the rollers 60 can apply sufficient pressure to seal the tape.

If a fluid lubricant is to be used then the fibre 12 is passed through the bath 54 on route to the roller 46. Alternatively, PTFE can be used as a solid lubricant either by pre-laminating the tapes or by applying the PTFE to the tape from an additional roller (not shown) in the apparatus of FIG. 3 or 4. The fibre is either obtained direct from a normal furnace or an alternative fibre manufacturing source or from a means of partially coating the fibre if required, as will be described below with reference to FIGS. 7 and 8. If Ethelene Glycol lubricant is used it may be necessary to use a non-adhesive sealing system, as the lubricant would tend to dissolve the adhesive. This problem could be solved by using a higher molecular weight lubricant e.g. Glycerene. A water soluble cutting fluid could also be used.

Figure 4:
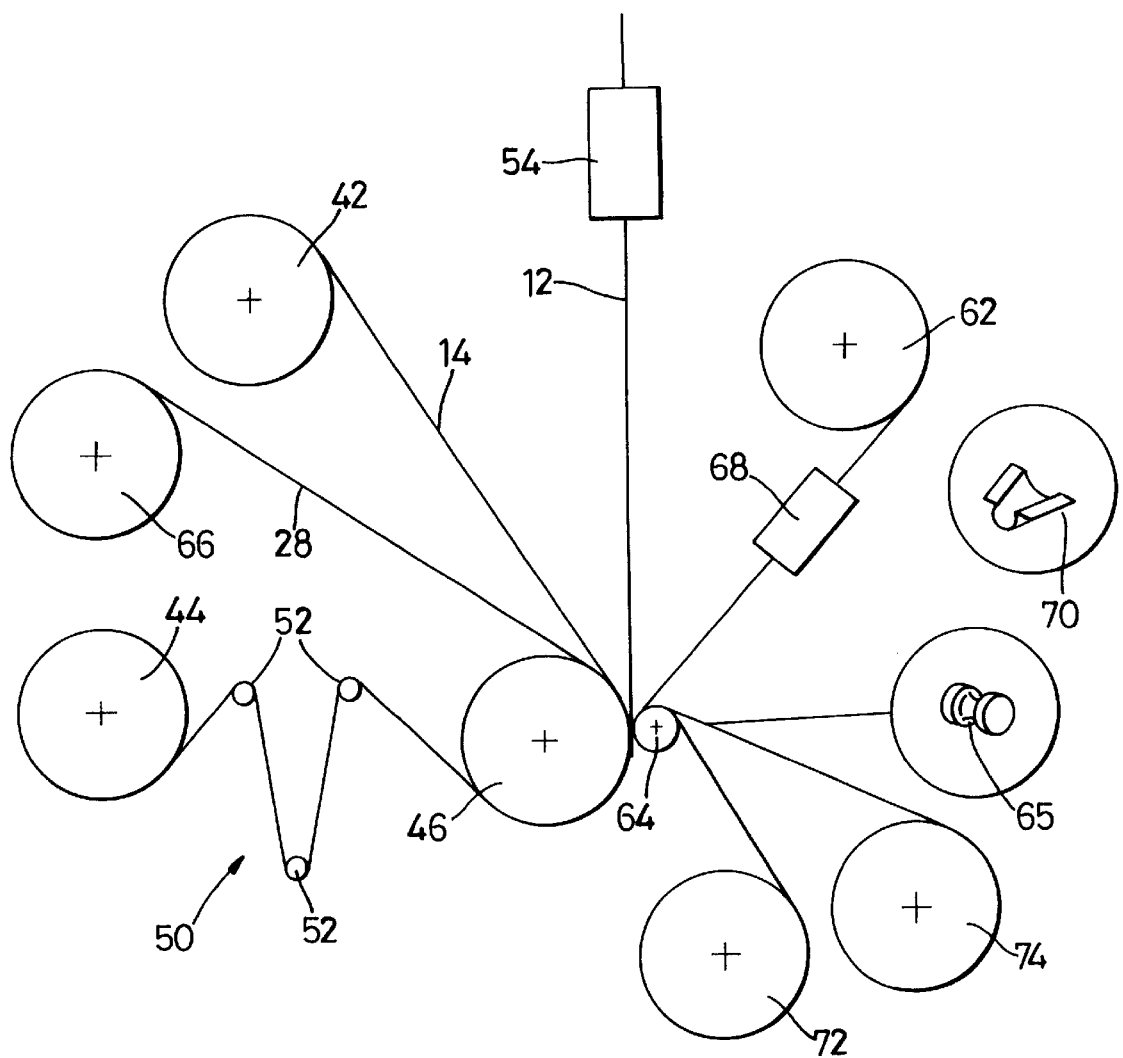
FIG. 4 illustrates an apparatus for manufacturing the fibres of FIGS. 2A, 2B and 2C.

FIG. 4 illustrates a method of manufacturing a removably coated optical fibre 10 as illustrated in FIGS. 2A to C comprising two elongate tapes 24 and 26. This apparatus additionally comprises a second tape drum 62 on which the second of said tapes is stored prior to use and an applicator wheel 64 which is utilised to bring the second tape 26 into contact with the roller 46. In addition, if a base tape 28 is to be utilised then an additional base tape drum 66 will also be required.

The method of manufacture includes passing the first coating tape around a portion of the roller 46, as in the aforementioned method; passing an optical fibre 12 around said roller 46 so as to rest on the first tape 24 and passing a second coating tape 26 around said portion of the roller 46 on the opposite side of said fibre 12 and collecting said coated tape on a collection drum 44.

Means may be provided for applying adhesive to either the first or the second tape adjacent the edges thereof prior to contact.

In order to manufacture the tape as illustrated in FIG. 2A a moulding apparatus 68, for example, in the form of a cam 70 as illustrated in the expanded portion of FIG. 4 is provided between the tape drum 62 and the roller 46 so as to mould the tape 26 into the shape illustrated in FIG. 2A. Also, if a base tape 28 is to be used a further drum 66 will be required to enable the application of this tape 28, as illustrated in FIG. 4. As the base tape provides added strength a Kevlar tape may be used.

In this embodiment as with that illustrated in FIG. 2B the wheel 64 will require a substantially "U"-shaped depression 65 therein so as not to press the tape around the recess onto the fibre.

With the fibre illustrated in FIG. 2B a second moulding apparatus is also required in the path between the first tape drum 42 and the roller 46. In addition, both the roller 46 and the wheel 64 will require substantially semi-circular cross-sectioned recesses.

In the fibre illustrated in FIG. 2C the moulding mechanisms will not be required nor will the recess in either the wheel 64 or the roller 46. However, additional tape drums 72 and 74 will be required to apply the tapes to either side of the fibre 12 during the manufacturing process, as with the remaining tapes.

With this method of manufacture there may be a sealing mechanism in which pressure is applied to the tapes adjacent their edges. However, the wheel may be sufficient to provide this result.

Figure 5:
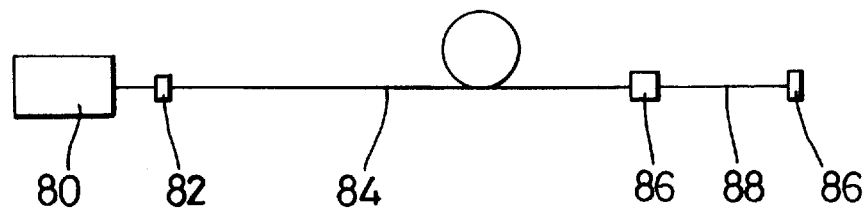
FIG. 5 illustrates a transmission system having an optical device, in accordance with the present invention.

FIG. 5 illustrates a removably clad optical fibre transmission system comprising a laser source 80 coupled through a coupler 82 to approximately a kilometer length of fully coated optical fibre 84. The optical fibre is then coupled through a coupler 86 to a length of removably coated optical fibre 88, as described above. In this transmission system radiation may be injected into the kilometer length optical fibre in the normal manner. Any dispersion within the fibre can be compensated for if the removably coated optical fibre 88 includes a dispersion equalising grating. In addition, direct fibre devices such as fused couplers can also be manufactured utilising removably clad optical fibre in accordance with the present invention.

In addition, the fibre 88 may include another form of grating to provide an optical device such as a non-intrusive tap. A further length of fibre may be connected after the removably coated optical fibre 88. Also, in some embodiments the partially coated optical fibre 48 may be placed between the laser source 80 and the kilometer length of coated fibre 84. The removably coated optical fibre is normally produced in lengths of less than 1 meter.

Figure 6:
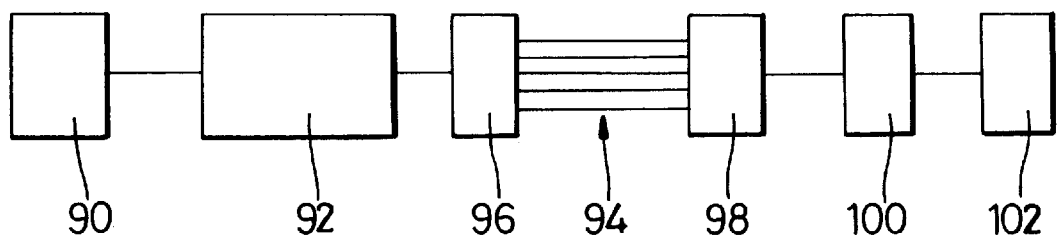
FIG. 6 illustrates a telecommunications system in accordance with the present invention.

FIG. 6 illustrates an optical fibre telecommunications system including a signal generating means 90 coupled to a laser source 92 which produces radiation in the near infrared low loss window for silica fibres which is injected into one of a plurality of transmission lines 94 through a multiplexor 96, in a normal fashion. One or more of the transmission lines 94 includes a length of removably coated optical fibre as described above. These fibres are coupled to a demultiplexor 98 and from there to a receiver including an optical/electrical converter 100 from where an electrical signal is transmitted to a final receiver 102. As above, the use of the removably coated optical fibre including a grating enables either dispersion compensation, non-intrusive tapping or any of the other functions discussed above.

Figure 7:
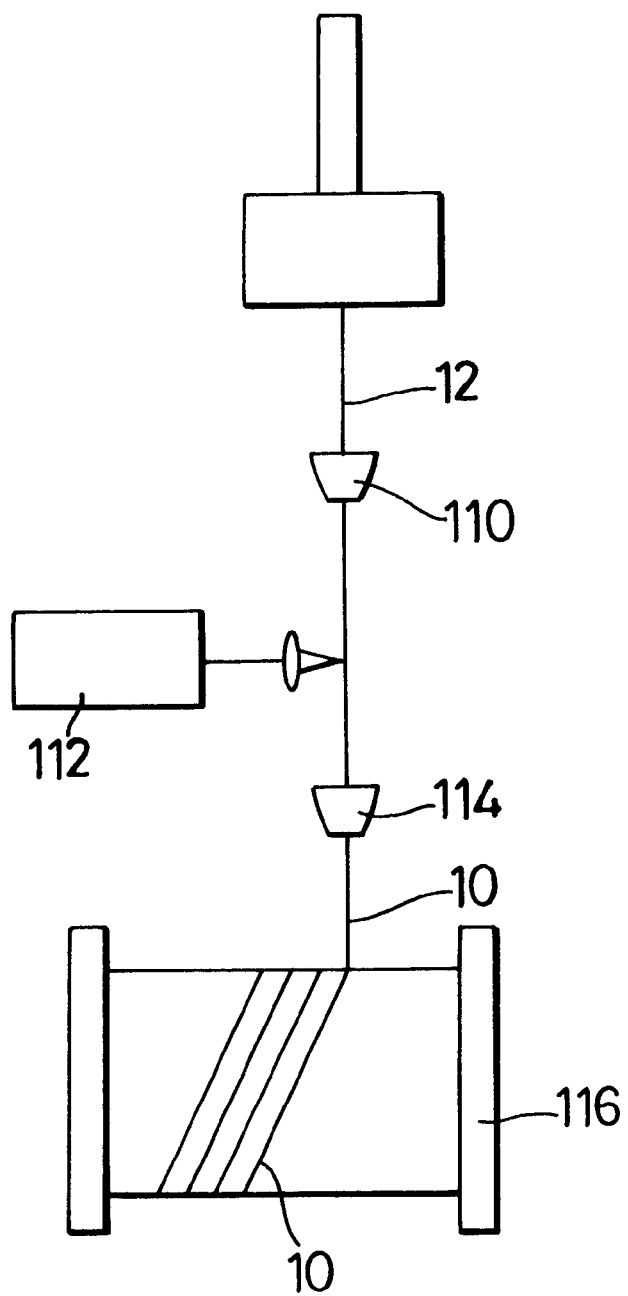
FIG. 7 illustrates an apparatus for manufacturing a partially coated optical fibre, in accordance with the present invention.

FIG. 7 illustrates an apparatus for producing a partially coated optical fibre 10, as described above, including apparatus 110 for coating a fluid radiation-curable uncured precursor of a plastics coating material upon an optical fibre so as to cover the external surface of the fibre core 12 completely, in the normal manner. Thereafter the coating material is cured over a main portion of the coated fibre surface by radiating the coating material with curing radiation, for example, from a UV lamp or laser 112. The irradiated main portion of the fibre is a portion extending longitudinally over the length of the fibre but having a circumferential extent of only from about 300% of a quadrant to about 390% of a quadrant. Thus, the fibre coating has a discontinuity in its covering of cured plastics material, as discussed above.

In addition, optionally the apparatus 112 may include means for curing the coating material over further portions of the coated fibre surface by irradiating said further portions with curing radiation from one or more further radiation sources, said further portions bridging the discontinuity.

Thereafter, the fibre is passed through an organic solvent bath 114 so as to remove the uncured coating material by dissolution or dispersion. The resulting partly coated optical fibre is then collected on a drum 116.

Figure 8:
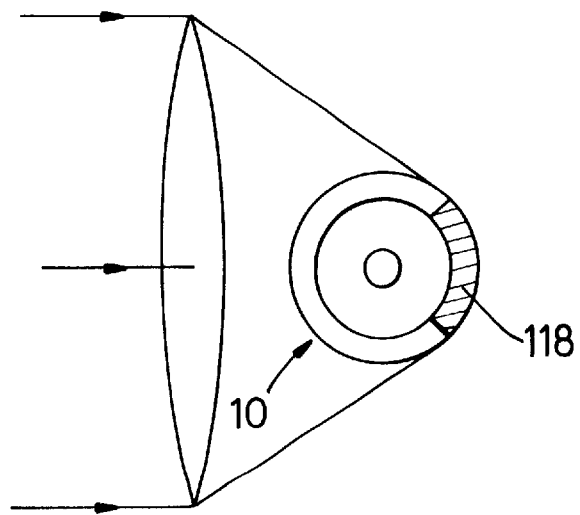
FIG. 8 is an enlarged illustration of a component of the apparatus illustrated in FIG. 7.

With reference to FIG. 7, the fibre 12 is produced from a preform 118 by pulling in a normal fashion and the uncured pre-former of the plastics coating is applied by pulling the fibre through the coating bath 110, in a known manner. Therefore, the UV lamp or laser 112 is focused onto the fibre 10. As can be seen in FIG. 8 if the UV lamp is focused such that a portion 118 of the fibre is "left in shadow" and is not directly irradiated by the UV light source then this portion of the fibre will remain uncured. 35 KJm$^{-2}$ of UV radiation at 250 or 335 nm is focused onto the coating to cure the coating during the manufacturing process, using a doped Mercury lamp which has been optimised for the purpose. The base coating material is strongly absorbing to UV radiation below 300 nm and the coating gels at a small percentage of the energy required to achieve full cure. Therefore, the 250 nm radiation can only be used to achieve a tack free surface.

Modifications may be incorporated without departing from the scope of the present invention. In particular, slight variations in the dimensions of the grating window may be included without departing from the scope of the invention as claimed and different light sources may be used to cure the coating.

I claim:

1. A removably coated optical fibre comprising:
   (i) an optical fibre; and
   (ii) a removable coating formed from an elongate tape having two edges, the tape being affixed adjacent to said edges along a substantial length of the tape to form a releasable seam, access to the fibre being obtainable by peeling apart said seam.

2. A removably coated optical fibre according to claim 1, further comprising a lubricant provided between said coating and said fibre.

3. A removably coated optical fibre according to claim 2, wherein said lubricant is a fluid.

4. A removably coated optical fibre according to claim 3, wherein said fluid lubricant is ethylene glycol.

5. A removably coated optical fibre according to claim 2, wherein said lubricant is a solid.

6. A removably coated optical fibre according to claim 5, wherein said lubricant is a layer of polytetraflurethene (PTFE).

7. A removably coated optical fibre according to claim 6, wherein said PTFE layer is applied to the inner surface of said elongate tape.

8. A removably coated optical fibre according to claim 1, wherein said tape is formed from a low density polyethelene.

9. A removably coated optical fibre according to claim 1, wherein said tape is sealed adjacent said edges using an adhesive.

10. A removably coated optical fibre according to claim 9, wherein said adhesive is a latex based pressure sensitive adhesive.

11. A removably coated optical fibre comprising:
    (i) an optical fibre; and
    (ii) a removable coating formed from first and second elongate tapes which are affixed on either side of said optical fibre along a substantial length of said tapes to form a releasable seam, access to the optical fibre being obtainable by peeling apart said tapes.

12. A removably coated optical fibre according to claim 11, further comprising a lubricant provided between said coating and said optical fibre.

13. A removably coated optical fibre according to claim 12, wherein said lubricant is a fluid.

14. A removably coated optical fibre according to claim 13, wherein said fluid lubricant is ethylene glycol.

15. A removably coated optical fibre according to claim 12, wherein said lubricant is a solid.

16. A removably coated optical fibre according to claim 15, wherein said lubricant is a layer of polytetraflurethene (PTFE).

17. A removably coated optical fibre according to claim 16, wherein said PTFE layer is applied to the inner surface of said elongate tape.

18. A removably coated optical fibre according to claim 11, wherein said tape is formed from a low density polyethelene.

19. A removably coated optical fibre according to claim 11, wherein a portion of said tapes are sealed using an adhesive.

20. A removably coated optical fibre according to claim 19, wherein said adhesive is a latex based pressure sensitive adhesive.

21. A removably coated optical fibre according to claim 11, wherein said first elongate tape is planar, said optical fibre resting thereon, and said second elongate tape is moulded so as to provide an elongate recess for receipt of said optical fibre.

22. A removably coated optical fibre according to claim 21, wherein said elongate recess has a substantially "U"-shaped cross-section.

23. A removably coated optical fibre according to claim 11, wherein both said first and second tapes comprise an elongate recess arranged such that when the tapes are co-joined a recess is formed for receipt of said optical fibre.

24. A removably coated optical fibre according to claim 23, wherein said recesses are both substantially semi-circular in cross section.

25. A removably coated optical fibre according to claim 11, wherein both the said first and second tapes are planar.

26. A removably coated optical fibre according to claim 25, wherein an additional tape is placed on either side of the optical fibre between the first and second planar tapes.

27. A method of manufacture of a removably coated optical fibre including an optical fibre; and a removable coating, the method comprising the steps of:
(a) passing an elongate coating tape around a portion of a roller on route from a tape drum to a collection drum;
(b) passing said optical fibre around said roller so as to rest on said tape; and
(c) passing said tape and optical fibre combination through a sealing means which releasably seals the tape adjacent said edges (16, 18) so as to releasably enclose said optical fibre within said removable coating, thereby forming said removably coated optical fibre.

28. A method according to claim 27, wherein said optical fibre is passed through a lubricant applicator prior to combination with said tape, at said roller.

29. A method according to claim 28, wherein said lubricant applicator is a bath of ethylene glycol.

30. A method according to claim 27, wherein the optical fibre is obtained directly from a fibre core drawing process.

31. A method according to claim 27, wherein said optical fibre is a partially coated fibre core obtained directly from a partial coating process.

32. A method of manufacturing a removably coated optical fibre including an optical fibre and a removable coating; the method comprising the steps of:
(a) passing a first coating tape around a portion of a roller;
(b) passing said optical fibre around said roller so as to rest on said first tape;
(c) passing a second coating tape around said portion of the roller, on the opposite side of said optical fibre so as to form said removably coated optical fibre.

33. A method according to claim 32, wherein said optical fibre is passed through a lubricant applicator prior to combination with said tape, at said roller.

34. A method according to claim 33, wherein said lubricant is a bath of ethylene glycol.

35. A method according to claim 32, wherein the optical fibre is obtained directly from a fibre drawing process.

36. A method according to claim 32, wherein said optical fibre is a partially coated optical fibre obtained directly from a partial coating process.

37. A method according to claim 32, wherein said first coating tape is moulded to provide a recess to receive said optical fibre.

38. A method according to claim 37, wherein said recess has a substantially u-shaped cross section.

39. A method according to claim 32, wherein both said first and second tapes are moulded prior to combination so that the combined tapes provide a recess for receipt of said optical fibre.

40. A method according to claim 39, wherein both said first and second tapes have an elongate recess with a substantially semi-circular cross section.

41. A method according to claim 32, wherein the first and second tapes are planar.

42. A method according to claim 41, wherein an additional tape is placed on either side of the optical fibre between the planar tapes in order to provide a removably coated optical fibre with a substantially rectangular cross section.

43. A method according to claim 32, wherein said first tape is provided on a coating tape.

44. A method according to claim 32, wherein said first and second coating tapes are formed from a low density polyethelene.

45. A method according to claim 42, wherein said base tape is formed from Kevlar.

46. A method according to claim 32, wherein the rate of accumulation of the removably coated optical fibre on a collector drum is controlled by an accumulator arm placed between the roller and the collector drum.

47. A method according to claim 32, wherein the edges of the tapes are releasably sealed by a sealing means located between the roller and the collector drum.

48. An apparatus for the manufacture of a removably coated optical fibre comprising an optical fibre; and a removable coating, the apparatus including:
(a) a storage drum for the storage of an elongate coating tape;
(b) means of accessing an optical fibre either directly from the fibre pulling process or alternatively from a fibre partial coating process;
(c) a collection drum to collect and store the removably coated optical fibre;
(d) a roller positioned on route between said storage drum and said collection drum and arranged such that said tape and said optical fibre are passed around a portion of the roller; and
(e) means arranged to enclose the tape around the optical fibre.

49. An apparatus according to claim 48, wherein a bath of lubricant is positioned between the means for accessing the optical fibre and the roller.

50. An apparatus according to claim 49, wherein the lubricant is ethylene glycol.

51. An apparatus according to claim 48, wherein the tape and optical fibre combination are passed through a sealing means which releasably seals the edges of the tape.

52. An apparatus according to claim 48, wherein an accumulator arm is placed between the roller and the collector drum in order to control the rate of accumulation of removably coated optical fibre on the collector drum.

53. An apparatus for the manufacture of a removably coated optical fibre comprising an optical fibre and a removable coating, the apparatus including:
  (a) a first tape drum for the storage of a first elongate coating tape;
  (b) means of accessing an optical fibre core either directly from the fibre pulling process or alternatively from a fibre partial coating process;
  (c) a collection drum to collect and store the removably coated optical fibre;
  (d) a roller positioned between said drums and arranged such that said tape and said optical fibre are passed around a portion of the roller; and
  (e) a second tape drum for storage of a second elongate tape, which is arranged to provide a second tape on the other side of the optical fibre from the first tape.

54. An apparatus, according to claim 53, comprising a further roller having a base tape which is arranged to position the base tape beneath the first coating tape.

55. An apparatus according to claim 54, wherein a moulding stage is provided between the first tape drum and the roller in order to mould the first tape to provide an elongate recess therein with a substantially "U"-shaped cross-section to receive the optical fibre.

56. An apparatus according to claim 54, wherein a moulding stage is provided between each tape drum and the roller in order to mould the tapes to provide each tape with an elongate recess therein with substantially semi-circular cross-sections which, when the tapes are combined, provides a recess to receive the optical fibre.

57. An apparatus according to claim 54, wherein the first and second tapes are planar and a means is provided for arranging an additional tape on either said of the optical fibre.

58. An apparatus according to claim 57, wherein a bath of lubricant is positioned between the means for accessing the optical fibre and the roller.

59. An apparatus according to claim 58, wherein the lubricant is ethylene glycol.

60. An apparatus according to claim 57, wherein the tape and optical fibre combination are passed through a sealer which releasably seals the tapes.

61. An apparatus according to claim 57, wherein an accumulator arm is placed between the roller and the collector drum in order to control the rate of accumulation of removably coated optical fibre on the collector drum.

62. An optical fibre transmission system comprising an assembly of at least a first and second optical fibre and an associated optical fibre coupler which couples the first and second optical fibres together, said first optical fibre comprising:
  (i) an optical fibre having a grating written therein and
  (ii) a removable coating formed from a first and second elongate tapes which are releasably affixed on either side of said optical fibre, access to the grating in the optical fibre being obtainable by peeling apart said tapes.

63. A transmission system according to claim 62, wherein the second optical fibre is a long-haul optical fibre having kilometer order lengths and the first optical fibre is of meter order lengths or less.

64. A transmission system according to claim 63, wherein the grating is a UV laser written grating.

65. An optical device including a removably coated optical fibre in which a grating is written, the grating being selected from the group consisting of:
  (a) a grating oriented normal to the direction of travel of light to be transmitted along the fibre grating acting as a dispersion equaliser; and
  (b) a grating oriented non-normally and non-aligned to the direction of travel of the light to be transmitted along the fibre, the grating acting as a non-intrusive radiation mode tap,
  the removably coated optical fibre comprising:
    (i) an optical fibre; and
    (ii) a removable coating formed from a first and second elongate tapes which are affixed on either side of said optical fibrealong a substantial length of said tapes to form a releasable seam, access to the optical fibre being obtainable by peeling apart said tapes.

66. An optical fibre telecommunications system comprising a laser pulse signal input device, an optical transmission line which comprises a removably coated optical fibre and which is optically coupled to the laser pulse signal input device and a receiver means for receiving laser pulse signals output from the optical transmission line to enable transduction of the signal carried by the laser pulses, said removably coated optical fibre having a grating written therein, the removably coated optical fibre comprising:
  (i) an optical fibre; and
  (ii) a removable coating formed from a first and second elongate tapes which are affixed on either aide of said optical fibrealong a substantial length of said tapes to form a releasable seam, access to the fibre core being obtainable by peeling apart said tapes.

* * * * *